US008428935B2

(12) United States Patent
Waelti et al.

(10) Patent No.: US 8,428,935 B2
(45) Date of Patent: Apr. 23, 2013

(54) NEURAL NETWORK FOR CLASSIFYING SPEECH AND TEXTUAL DATA BASED ON AGGLOMERATES IN A TAXONOMY TABLE

(75) Inventors: Paul Waelti, Buchs (CH); Carlo A. Trugenberger, Geneva (CH); Frank Cuypers, Zurich (CH); Christoph P. Waelti, Buchs (CH)

(73) Assignee: Infocodex AG, Buchs (CH)

( * ) Notice: Subject to any disclaimer, the term of this patent is extended or adjusted under 35 U.S.C. 154(b) by 1459 days.

(21) Appl. No.: 11/659,962

(22) PCT Filed: Aug. 9, 2005

(86) PCT No.: PCT/EP2005/053921
§ 371 (c)(1),
(2), (4) Date: Jul. 17, 2007

(87) PCT Pub. No.: WO2006/018411
PCT Pub. Date: Feb. 23, 2006

(65) Prior Publication Data
US 2007/0282598 A1    Dec. 6, 2007

(30) Foreign Application Priority Data

Aug. 13, 2004  (WO) ............... PCT/EP04/051798

(51) Int. Cl.
*G06F 17/21*    (2006.01)
*G06F 17/20*    (2006.01)
*G06F 17/27*    (2006.01)

(52) U.S. Cl.
USPC ............................ 704/10; 704/1; 704/9

(58) Field of Classification Search .................. None
See application file for complete search history.

(56) References Cited

U.S. PATENT DOCUMENTS

| 5,778,362 | A  | * | 7/1998 | Deerwester ................... 1/1 |
| 6,263,334 | B1 | * | 7/2001 | Fayyad et al. ................ 707/737 |
| 6,278,987 | B1 | * | 8/2001 | Reed et al. .................... 706/45 |
| 6,446,061 | B1 | * | 9/2002 | Doerre et al. ................. 707/738 |
| 6,701,318 | B2 | * | 3/2004 | Fox et al. ...................... 707/706 |

(Continued)

FOREIGN PATENT DOCUMENTS
WO        03 052627       6/2003

OTHER PUBLICATIONS

Fowler et al. "Information Navigator: An Information System Using Associative Networks for Display and Retrieval", University of Texas—Pan American, Technical Report NAG9-551, #92-1, 1992.*
Iiritano, et al., "Managing the Knowledge Contained in Electronic Documents: a Clustering Method for Text Mining", Proceedings of Second International Dexa Workshop on Theory and Applications of Knowledge Management, pp. 454-458, 2001.

*Primary Examiner* — Jesse Pullias
(74) *Attorney, Agent, or Firm* — Oblon, Spivak, McClelland, Maier & Neustadt, L.L.P.

(57) ABSTRACT

A speech and textual analysis device and method for forming a search and/or classification catalog. The device is based on a linguistic database and includes a taxonomy table containing variable taxon nodes. The speech and textual analysis device includes a weighting module, a weighting parameter being additionally assigned to each stored taxon node to register recurrence frequency of terms in the linguistic and/or textual data that is to be classified and/or sorted. The speech and/or textual analysis device includes an integration module for determining a predefinable number of agglomerates based on the weighting parameters of the taxon nodes in the taxonomy table and at least one neuronal network module for classifying and/or sorting the speech and/or textual data based on the agglomerates in the taxonomy table.

19 Claims, 6 Drawing Sheets

U.S. PATENT DOCUMENTS

| | | |
|---|---|---|
| 6,711,585 B1 | 3/2004 | Copperman et al. |
| 6,886,010 B2 * | 4/2005 | Kostoff .................................. 1/1 |
| 7,340,451 B2 * | 3/2008 | Sacco ............................ 707/694 |
| 2002/0123882 A1 * | 9/2002 | Mohammed .................... 704/10 |

* cited by examiner

NEURAL NETWORK FOR CLASSIFYING SPEECH AND TEXTURAL DATA BASED ON AGGLOMERATES IN A TAXONOMY TABLE

BACKGROUND OF THE INVENTION a) Field of the Invention

The invention relates to a system and a method for automated language and text analysis by the formation of a search and/or classification catalog, with data records being recorded by means of a linguistic databank and with speech and/or text data being classified and/or sorted on the basis of the data records (keywords and/or search terms). The invention relates in particular to a computer program product for carrying out this method.

b) Description of the Related Art

In recent years, the importance of large databanks, in particular databanks linked in a decentralized form, for example by networks such as the world wide backbone network Internet, has increased exponentially. More and more information, goods and/or services are being offered via such databanks or networks. This is evident just from the omnipresence of the Internet nowadays. The availability and amount of such data in particular has now resulted, for example, in Internet tools for searching for and finding relevant documents and/or for classification of documents that have been found having incredible importance. Tools such as these for decentralized databank structures or databanks in general are known. In this context, the expression "search engines" is frequently used in the Internet, such as the known Google™, Alta Vista™ or structured presorted link tables such as Yahoo™.

The problem involved in searching for and/or cataloging of text documents in one or more databanks include the following: (1) indexing or cataloging of the content of the documents to be processed (content synthesis), (2) processing of a search request of the indexed and/or catalogued documents (content retrieval). The data to be indexed and/or catalogued normally comprises unstructured documents, such as text, descriptions, links. In more complex databanks, the documents may also include multimedia data, such as images, voice/audio data, video data, etc. In the Internet, this may for example be data which can be downloaded from a website by means of links.

US patent Specification U.S. Pat. No. 6,714,939 discloses a method and a system such as this for conversion of plain text or text documents to structured data. The system according to the prior art can be used in particular to check for and/or to find data in a databank.

Neural networks are known in the prior art and are used, for example, to solve optimization tasks, for pattern recognition, and for artificial intelligence, etc. Corresponding to biological nerve networks, a neural network comprises a large number of network nodes, so-called neurons, which are connected to one another via weighted links (synapses). The neurons are organized and interconnected in network layers. The individual neurons are activated as a function of their input signals and produce a corresponding output signal. A neuron is activated via an individual weighting factor by the summation over the input signals. Neural networks such as these have a learning capability in that the weighting factors are varied systematically as a function of predetermined exemplary input and output values until the neural network produces a desired response in a defined predictable error range, such as the prediction of output values for future input values. Neural networks therefore have adaptive capabilities for learning and storage of knowledge, and associated capabilities for comparison of new information with stored knowledge. The neurons (network nodes) can assume a rest state or an energized state. Each neuron has a plurality of inputs and one, and only one, output, which is connected to the inputs of other neurons in the next network layer or, in the case of an output node, represents a corresponding output value. A neuron changes to the energized state when a sufficient number of inputs to the neuron are energized above a specific threshold value of that neuron, that is to say when the summation over the inputs reaches a specific threshold value. The knowledge is stored by adaptation in the weightings of the inputs of a neuron and in the threshold value of that neuron.

The weightings of a neural network are trained by means of a learning process (see for example G. Cybenko, "Approximation by Superpositions of a sigmoidal function", Math. Control, Sig. Syst., 2, 1989, pp 303-314; M. T. Hagan, M. B. Menjaj, "Training Feedforward Networks with the Marquardt Algorithm", IEEE Transactions on Neural Networks, Vol. 5, No. 6, pp 989-993, November 1994; K. Hornik, M. Stinchcombe, H. White, "Multilayer Feedforward Networks are universal Approximators", Neural Networks, 2, 1989, pp 359-366 etc.).

In contrast to supervised learning neural nets, no desired output pattern is predetermined for the neural network for the learning process of unsupervised learning neural nets. In this case, the neural network itself attempts to achieve a representation of the input data that is as sensible as possible. So-called topological feature maps (TFM) such as Kohonen maps are known, for example, in the prior art. In the case of topological feature maps, the network attempts to distribute the input data as sensibly as possible over a predetermined number of classes. In this case, it is therefore used as a classifier. Classifiers attempt to subdivide a feature space, that is to say a set of input data, as sensibly as possible into a total of N sub-groups. In most cases, the number of sub-groups or classes is defined in advance. A large number of undefined interpretations can be used for the word "sensible". By way of example, one normal interpretation for a classifier would be: "form the classes such that the sum of the distances between the feature vectors and the class center points of the classes with which they are associated is as small as possible." A criterion is thus introduced which is intended to be either minimized or maximized. The object of the classification algorithm is to carry out the classification process for this criterion and the given input data in the shortest possible time.

Topological feature maps such as Kohonen maps allow a multi-dimensional feature space to be mapped into one with fewer dimensions, while retaining the most important characteristics. They differ from other classes of neural network in that no explicit or implicit output pattern is predetermined for an input pattern in the learning phase. During the learning phase of topological feature maps, they themselves adapt the characteristics of the feature space being used. The link between a classical classifier and a self-organizing neural network or a topological feature map (TFM) is that the output pattern of a topological feature map generally comprises a single energized neuron. The input pattern is associated with the same class as the energized output neuron. In the case of topological feature maps in which a plurality of neurons in the output layer can be energized, that having the highest energization level is generally simply assessed as the class associated with the input pattern. The continuous model of a classifier in which a feature is associated with specific grades of a class is thus changed to a discrete model.

The use of Kohonen maps, inter alia, is known from the prior art. For example, the document XP002302269 by Farkas J. "Using Kohonen Maps to Determine Document Similarity" discloses use in this way. An area-specific vocabulary ("keywords") is first of all set up in this case for a given problem, and a problem-specific thesaurus is then constructed from this (in accordance with ISO 2788). However, this prior art has the disadvantage that the only terms which can be extracted from the documents to be classified are those which likewise occur in the constructed thesaurus. For this reason in particular, this system does not allow the problem solution to be automated. The vectors which finally flow into a Kohonen network with a predetermined magnitude are then formed from the extracts mentioned. In this case, the classical Euclidian metric is used as a similarity measure. In another system from the prior art (Iritano S. and M. Ruffolo: "Managing the knowledge contained in electronic documents: a clustering method for text mining", XP010558781), words are taken from the documents to be analyzed, are reduced to stem forms (lexicon analysis) and the frequencies of the various stem words in each document are determined. Predetermined words that are not of interest can be excluded in this case. The stem words (referred to as synonyms in the publication) are indexed for the search and a specific clustering algorithm is finally applied which uses the overlap of words in the various documents as a similarity measure. If a restriction to English documents is applied, it is also possible to determine the sense on the basis of the Princeton University Word-Net. One of the disadvantages of this prior art is that the method produces only abstract clusters which do not allow any sense to be determined without situational human work, that is to say even this system from the prior art does not allow effective automation of the method. Furthermore, the restriction to the Princeton University WordNet as a knowledge base results in a constraint which, for example, does not allow universal taxonomy or use with more than one language.

Another prior art, WO 03/052627 A1 by Semper Peter Paul et al. "Information Resource Taxonomy", describes a method which determines the frequency with which words occur in documents and forms clusters in accordance with the "TACT specification" (PCT/AU01/00198). Phrases which occur frequently are determined for noise reduction purposes in an initial phase and are then deleted if their frequency exceeds a specific limit. However, the patent specification relates essentially to a method for automatic generation of cluster hierarchies, that is to say of hierarchically structured clusters in documents. The term "resource taxonomy" used in this patent specification relates to the arrangement of the document clusters (comparable to a hierarchical directory structure for sensible storage of the documents). In WO 03/052627 A1, "taxonomy" refers to a cluster structure of directories (directory structure). In contrast, in the present patent specification according to the invention, "taxonomy" refers to the content classification of words and terms. Finally, patent Specification U.S. Pat. No. 6,711,585 B1 "System and Method for Implementing a Knowledge Management System" from the inventors Copperman Max et al. discloses a similar method with the construction of a cluster hierarchy and the association of documents and checking to form a specific cluster as WO03/052627 A1. The individual documents are in this case formally structured as "knowledge containers" (comprising meta data, taxonomy tags, marked content, original content and links). This prior art has the disadvantage, inter alia, that the cluster formation process relates to individual documents so that effective global recording of the terms that occur in the documents is impossible. Subject breakdown by further processing is thus precluded or greatly restricted. In particular, this prevents appropriate automation of the method.

BRIEF SUMMARY OF THE INVENTION

One object of this invention is to propose a novel system and automated method for the formation of a search and/or classification catalog, which does not have the abovementioned disadvantages of the prior art. One particular aim is to propose an automated, simple and economic method in order to classify and/or to sort, and/or to index for a search request, a large amount of language and/or text data which, for example, is stored such that it can be accessed via one or more databanks. The aim of the invention is to produce an indexing method for efficient and reliable thematic searching, that is to say for finding documents which are as similar as possible to a given request, comprising an entire text document or individual keywords. A further aim of the invention is to produce a clearly defined measure for objective assessment of the similarity of two documents when compared, and for the ranking of documents. An additional aim of the invention is to produce a method for identification of associated document clusters, that is to say of documents which are virtually identical (different versions of the same document with minor changes).

According to the present invention, this aim is achieved in particular by the elements of the independent claims. Further advantageous embodiments are also disclosed in the dependent claims and in the description.

In particular, these aims are achieved by the invention in that a language and text analysis apparatus is used to form a search and/or classification catalog which has at least one linguistic databank for association of linguistic terms with data records, in which case the linguistic terms comprise at least keywords and/or search terms, and language and/or text data can be classified and/or sorted corresponding to the data records, in that the language and text analysis apparatus has a taxonomy table with variable taxon nodes on the basis of the linguistic databank, in which case one or more data records can be associated with one taxon node in the taxonomy table, and in which case each data record has a variable significance factor for weighting of the terms on the basis of at least filling words and/or linking words and/or keywords, in that each taxon node additionally has a weighting parameter for recording of frequencies of occurrence of terms within the language and/or text data to be sorted and/or to be classified, in that the language and/or text analysis apparatus has an integration module for determination of a predefinable number of agglomerates on the basis of the weighting parameters of the taxon nodes in the taxonomy table, with one agglomerate comprising at least one taxon node, and in that the language and/or text analysis apparatus has at least one neural network module for classification and/or for sorting of the language and/or text data on the basis of the agglomerates in the taxonomy table. The linguistic databank may, for example, comprise multilingual data records. This embodiment variant has the advantage, inter alia, that documents, collections or entirely general data items can be grouped logically for example in databanks, in particular decentralized databanks without human intervention (for example no training of a network, no preparation of content-specific taxonomy, etc.). Furthermore, it is simple to produce an overview of the thematic content of a document collection by means of a topological map. This apparatus and automated method can thus be regarded as considerable progress for "table of content" methods. In particular, the invention produces an extremely reliable and efficient tool for thematic searching (identification of documents on the basis of a search input in a natural language) in addition to conventional searching from the prior art by means of a combination of search terms. In particular, search results can very easily be displayed clearly by means of the projection onto the topological and/or geographic map as a so-called "heat map" display, in contrast to the conventional uncategorized list formats. Furthermore, the invention produces a measure which can be checked easily for comparison and/or similarity assessment of documents. The invention likewise produces real multilingual knowledge management with search functions in more than one language. Until now, this has not been possible with the prior art. In conclusion, the invention even allows automated generation of "descriptors", in which case descriptors reflect the contact characteristic of a document (also with cross-language characteristics). The invention thus produces an indexing method for efficient and reliable thematic searching, that is to say for finding documents which are as similar as possible to a given request, comprising an entire text document or individual keywords. The invention likewise produces a clearly defined measure for objective assessment of the similarity of two documents for the comparison and ranking of documents. In addition, the invention produces a method for identification of associated document clusters, that is to say documents which are virtually identical (different versions of the same document with minor changes).

In one embodiment variant, at least one linguistic databank covers the association of linguistic terms with the data records, in which case the language and/or text analysis apparatus can be used to classify and/or sort language and/or text data on the basis of the data records, and in which the linguistic terms comprise at least keywords and/or search terms, with the linguistic databank having links between words and/or linked terms of similar meaning, which links can be associated with synonym groups in a taxonomy table with the language and/or text analysis apparatus having a weighting module for weighting of table elements in the taxonomy table on the basis of the frequency of occurrence of individual links in the linguistic databank with the language and/or text analysis apparatus having an integration module which can be used to generate a multidimensional, weighted contact matrix on the basis of agglomerates of elements in the taxonomy table, with the language and/or text analysis apparatus having at least one neural network module for classification and/or sorting of the language and/or text data on the basis of the content matrix, in which case constraints which correspond to definable descriptors of the language and/or text analysis apparatus can be determined for one or more subject groups. This embodiment variant has the same advantages, inter alia, as those above. In particular, as above, there is no longer any need for human preparation for example for the classification of any desired document collection: no preparation of a specific vocabulary, no specific taxonomy, no specific thesauruses and in particular no complex training of the document classification. Furthermore, the multiple language problem is solved consistently (an English translation of a German document is given the same classification as the German original). These are direct consequences from the reference to the linguistic databank with the universal taxonomy and the situationally constructed projection onto optimum content space. In addition, until now, it has been possible to achieve this only inadequately with any of the known prior art.

In one embodiment variant, the neural network module has at least one or more self-organizing Kohonen maps. This embodiment variant has the same advantages, inter alia, as the previous embodiment variant. In addition, the use of self-organizing network techniques, for example SON or Kohonen maps, allows further automation of the method.

In another embodiment variant, the language and text analysis apparatus has an entropy module for determination of an entropy parameter, which can be stored in a memory module, on the basis of the distribution of a data record in the language and/or text data. The entropy parameter may be given, for example, by $Entropy_{DR}=\ln(freqsum_{DR})-\Sigma F_{DR}\ln(F_{DR})/freqsum_{DR}$. This embodiment variant has the advantage, inter alia, that an additional relevance parameter can be determined. A term which appears in a well scattered form over all of the language and/or text data and/or over all the documents has a high "entropy" and will contribute little to the process of distinguishing between the documents. The entropy can thus make a considerable contribution to the efficiency of the apparatus and/or method according to the invention.

In yet another embodiment variant, the apparatus has a hash table which is associated with the linguistic databank in which case a hash value can be used to identify linguistically linked data records in the hash table. This embodiment variant has the advantage, inter alia, that linguistically linked data records such as "common", "sense" and "common sense" can be found much more quickly and considerably more efficiently.

In a further embodiment variant, the data records, for example, can be associated with a language by means of a language parameter and can be identified as a synonym in the taxonomy table. This embodiment variant has the advantage, inter alia, that multilingual text or language data can also be classified and/or sorted by means of the language and text analysis apparatus.

In one embodiment variant, the agglomerates can be associated with an n-dimensional content matrix in an n-dimensional content space and, for example, n may be equal to 100. However, it should be noted that any other desired natural number may likewise be worthwhile for specific applications. This embodiment variant has the advantage, inter alia, that it for the first time allows efficient association with the self-organizing networks since, otherwise, the content space has too many degrees of freedom than that for which it would still be valid, or too few, so that it is likewise no longer valid.

In another embodiment variant, the language and text analysis apparatus has descriptors which can be used to determine constraints which correspond to defineable descriptors for a subject group. This embodiment variant has the advantage, inter alia, that the documents are brought to the correct global region by means of the SOM technique.

In a further embodiment variant, the taxon nodes in the taxonomy table are produced on the basis of a universal, subject-independent, linguistic databank, with the databank having the universal, subject-independent, linguistic databank. This embodiment variant has the advantage, inter alia, that this makes it possible for the first time to carry out cataloguing and/or indexing in a completely automated manner on the basis of a taxonomy which is not subject-specific and therefore does not need to be defined in advance.

At this point, it should be stated that the present invention relates not only to the method according to the invention but also to an apparatus for carrying out this method. Furthermore, it is not restricted to the stated system and method, but likewise relates to a computer program product for implementation of the method according to the invention.

BRIEF DESCRIPTION OF THE SEVERAL VIEWS OF THE DRAWINGS

Embodiment variants of the present invention will be described in the following text with reference to examples. The examples of the embodiments are illustrated by the following attached figures.

DETAILED DESCRIPTION OF THE INVENTION

Figure 1:
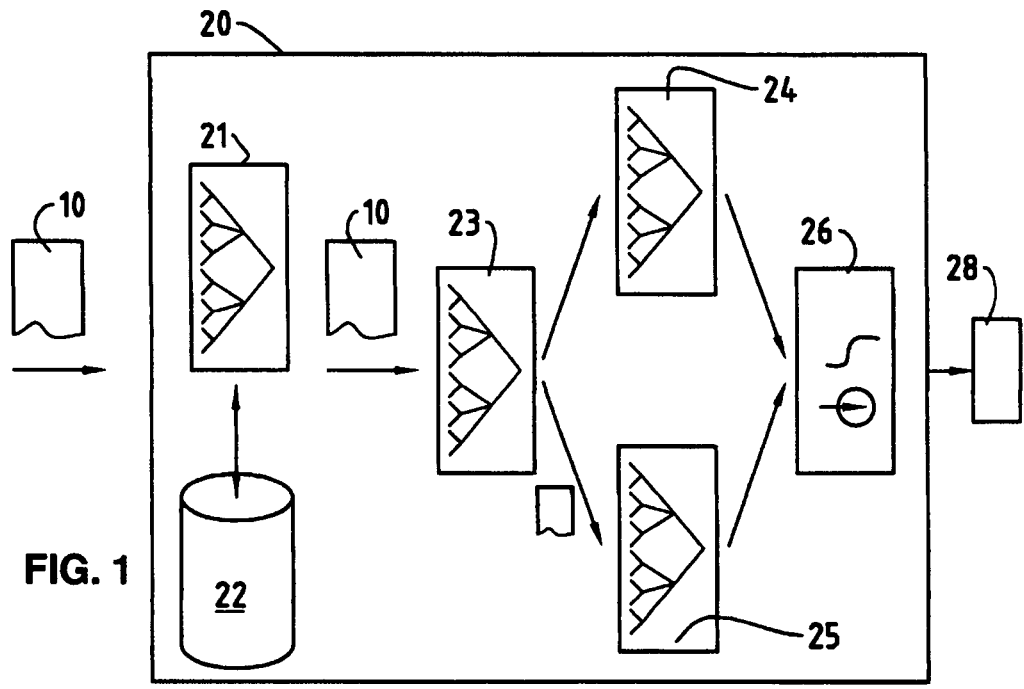
FIG. 1 shows a block diagram which schematically illustrates the method and/or system according to the invention.
Figure 2:
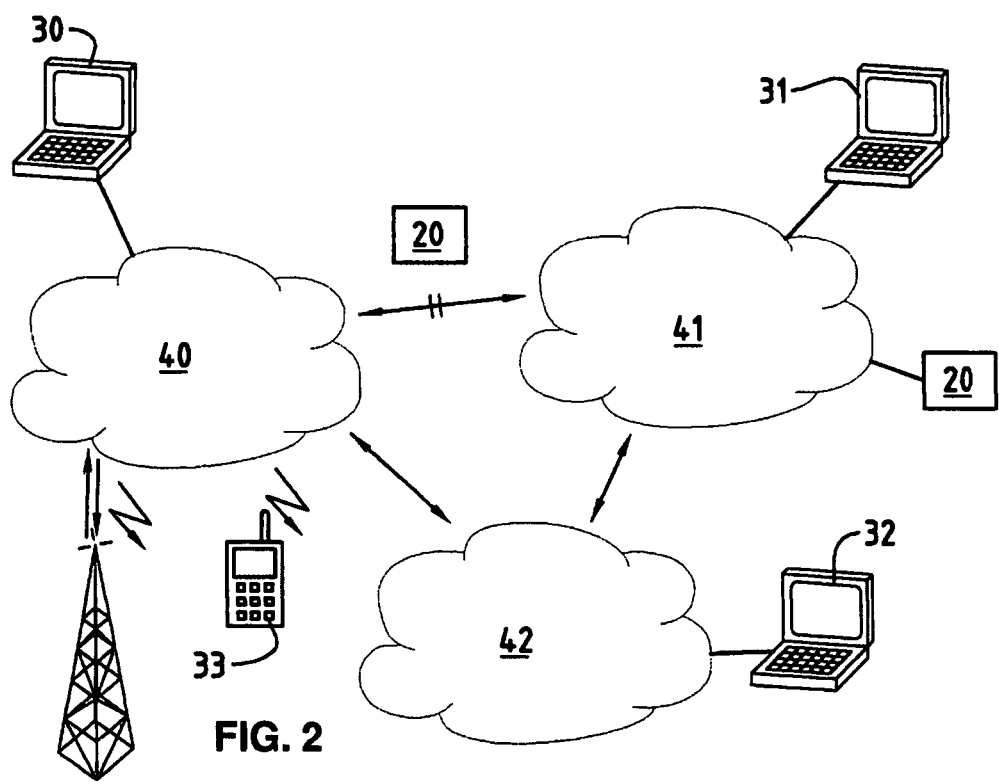
FIG. 2 likewise shows a block diagram, which illustrates the use of an apparatus according to the invention in a network with decentralized databanks and/or data sources for thematic recording and/or cataloging and/or monitoring of the data flows in the network.

FIGS. 1 to 6 schematically illustrate an architecture which can be used for implementation of the invention. In this exemplary embodiment, the language and text analysis apparatus has at least one linguistic databank 22 for association of linguistic terms with data records in order to form a search and/or classification catalog. The linguistic databank 22 may also include, for example, multilingual data records. The data records can be associated with a language and, for example, can be identified as synonyms in the taxonomy table by means of a language parameter. The linguistic databank 22 may, for example, have an associated hash table, in which case linguistically linked data records in the hash table can be identified by means of a hash value. The language and text analysis apparatus can be used to classify and/or sort language and/or text data 10 on the basis of the data records. The linguistic terms comprise at least keywords and/or search terms. It is important to note that the language and/or text data may also include data of an entirely general nature, such as multimedia data, that is to say inter alia digital data such as texts, graphics, images, maps, animations, moving images, video, Quick-Time, audio records, programs (software), data accompanying programs and hyperlinks or references to multimedia data. This also includes, for example, MPx (MP3) or MPEGx (MPEG4 or 7) Standards, as are defined by the Moving Picture Experts Group.

The language and text analysis apparatus has a taxonomy table 21 with variable taxon nodes. One or more data records can be associated with one taxon node in the taxonomy table 21. Each data record has a variable significance factor for weighting of the terms on the basis at least of filling words and/or linking words and/or keywords. The language and text analysis apparatus has a weighting module 23. In addition, a weighting parameter is stored, associated with each taxon node, in order to record the frequencies of occurrence of terms within the language and/or text data 10 to be classified and/or sorted. The language and/or text analysis apparatus has an integration module 24 in order to determine a predefinable number of agglomerates on the basis of weighting parameters of the taxon nodes in the taxonomy table 21. An agglomerate has at least one taxon node. The agglomerates may, for example, form an n-dimensional content space. As an exemplary embodiment, n may be chosen to be equal to 100, for example. The language and/or text analysis apparatus has at least one neural network module 26 for classification and/or sorting of the language and/or text data 10 on the basis of the agglomerates in the taxonomy table 21. The neural network module 26 may, for example, have at least one topological feature map (TFM), such as a self-organizing Kohonen map. Appropriate constraints, for example, for a subject group can be determined by means of defineable descriptors.

The language and text analysis apparatus may additionally have, for example, an entropy module 25 in order to determine an entropy parameter, which is stored in a memory module, on the basis of the distribution of a data record in the language and/or text data 10. The entropy module 25 may, for example, be in the form of software and/or hardware. The entropy parameter may, for example, be given by $$\text{Entropy}_{DR} = In(\text{freqsum}_{DR}) - \Sigma F_{DR} In(F_{DR})/\text{freqsum}_{DR}$$

The results, that is to say the output, may for example be displayed on an output unit 28 for a user, for example additionally via a network 40, 41, 42.

For the analysis and search functions, the text or language data to be analyzed, such as a pure text document, can be subdivided into the following components: a) an n-dimensional vector for characterization of the thematic content of the document, for example n may be chosen to be equal to 100; b) m descriptors which are characteristic of a document and represent constraints for optimization. The number of descriptors may, for example, be m=20; c) a set of meta data, which can be automatically extracted from the document, that is to say for example the title of the document, the author, the dates of publication of the document, the location or address of the document, such as a URL (Unified Resource Location), File Format PDF (Portable Document Format), Microsoft Word, HTML (Hyper Text Markup Language), HDML (Handheld Device Markup Language), WML (Wireless Markup Language) VRML (Virtual Reality Modeling Language), XML (Extensible Markup Language), JPEG (Joint Photographic Experts Group) etc., MPEG (Moving Picture Experts Group), number of words and/or terms, number of integer and/or rational numbers, language of the majority of the terms in the document, additional rules or characteristics, etc.

The axes of the n-dimensional content space depend on the thematic linking and/or on the inner links between all of the language and/or text data 10 to be analyzed.

The axes can sensibly be constructed such that the relevant subject areas of the language and/or text data 10 are reproduced as well as possible, and irrelevant background (noise) is not displayed, or is greatly suppressed. The generation of the axes and the projection are based on the linguistic and, for example multilingual databank 22 that has been mentioned and is associated with a universal taxonomy and/or a universal taxonomy tree. Universal means that there is no need to predefine a specific region by means of the taxonomy before the cataloging and/or indexing of the text and/or language data 10. Until now, this has not been possible in this way in the prior art.

Words, expressions and/or terms which occur in a text document are compared with a large list of words which are stored in the linguistic databank 22. In this context, "terms" is intended to mean linked words such as the expression "nuclear power plant", "Commission of Human Rights", or "European Patent Office". In the exemplary embodiment, 2.2 million entries have been found to be sufficient for a linguistic databank 22 such as this for the languages of English, French, German and Italian, although the databank 22 may, of course, also have a greater or a lesser number of entries, as required. Words/terms with the same meaning (synonyms) can be linked for example in synonym groups (synsets), for example also jointly for all languages. These synsets are then associated with a taxon node in the hierarchical taxonomy table or taxonomy tree. The distribution of the taxon node hits (entries) for specific language and/or text data 10 or for a document to be analyzed is a reliable measure for its subject content.

Figure 3:
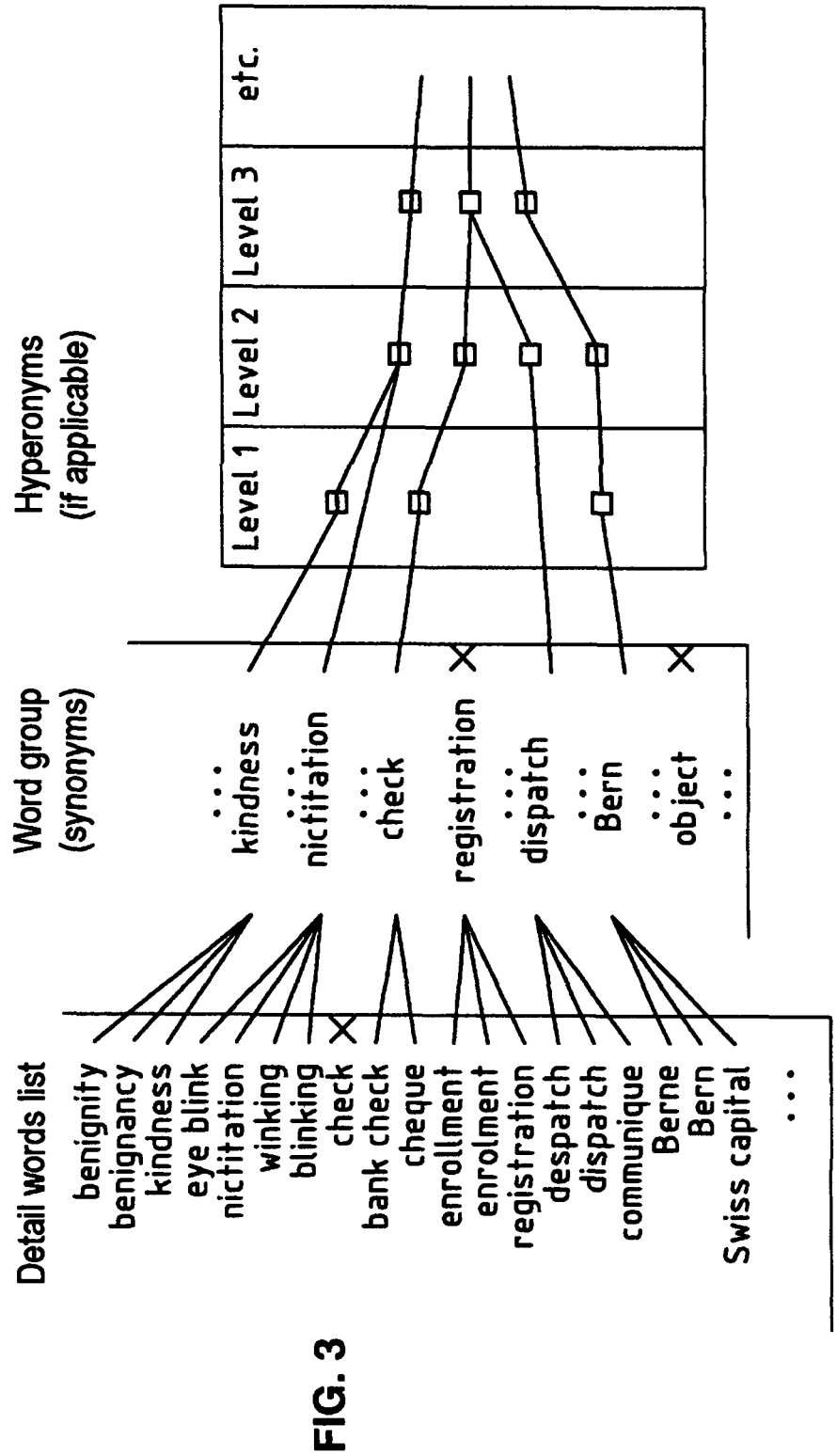
FIG. 3 shows a block diagram which illustrates the structure of a taxonomy table 21.

FIG. 3 shows such a structure for a taxonomy table 21. By way of example, entries for each language can be structured as follows:

| Column | Format | Content |
| --- | --- | --- |
| 1 | N | Classification code (for example decimal) for the taxon node (universal code for all languages) |
| 2 | T35 | Name of the taxon node (hyperonym/generic term) |
| 3 | N1 | Hierarchy level in the taxonomy tree |
| 4 | N1.3 | Statistical weighting of the node (governed by means of local entropy specifically for long document collections that are rich in content) |
| 1 | N6 | Synset code (the same for all languages) |
| 2 | N2 | Sequential number within a synset and a language (0 may, for example, correspond to a major term within the group per language) |
| 3 | N1 | Type of expression or term (1 = noun/2 = verb/3 = adjective/ 4 = adverb, pronouns etc./5 = name) |
| 4 | N1 | Significance of the expression/word (0 = filling word ["glue" word]/1 = low significance/2 = medium/3 = high/ 4 = very high significance) |
| 5 | N | 64-bit hash value for faster identification of terms (expression comprising a plurality of words) |
| 6 | T35 | Expression/term |
| 7 | N | Hyperonym code (association with a taxon node in the taxonomy table with a (for example decimal) classification) |
| 8 | N1 | Language code (0 = language-independent name/1 = English/2 = German/ 3 = French/4 = Italian) |
| 9 | N2 | Flag for expressions/terms which appear in more than one synset (synonym group)* |

*The expression "gift" exists in English and German, but has a completely different meaning in the two languages.
In addition, expressions exist with a different meaning in the same language. The English word "fly", for example is used as "flight" or "trouser fly". The expression "window" means an opening/window, but "windows" can relate to an opening or an operating system. On the other hand, "Windows XP" is in turn unique.

By way of example, the method steps for an initial analysis of the language and/or text data 10 may appear as follows: (1) input a document, that is to say language and/or text data 10; (2) a first estimate of the document; (3) word processing: i) extraction of the expression/term. ii) comparison with the entries in the linguistic databank taking account of the appropriate language and lexicography rules for correct association. Generation of the synset and hyperonym codes, of the significance and language by means of the databank. iii) generation of new expressions and/or synsets for expressions or terms that have not been found. iv) determination of the frequency of the expression/term per document. v) adaptation of the language, if necessary; (4) associated storage of the information; (5) next document or next language and/or text data 10.

In order to determine the entropy and a relevance index per synset (synonym group), the frequency is calculated for each synset (isyn) and each language and/or text data item 10 or document (idoc) on the following basis:

$$F_{isyn}(idoc) = norm(idoc) \sum_{word \in isyn} f_{word} \cdot sig_{word},$$

where $f_{word}$=frequency of the word in idoc; $sig_{word}$=significance of the word on the basis of the linguistic databank (0, . . . ,4)

$$norm(idoc) = \frac{\min(\text{weighted number of expression in } idoc, 500)}{\text{weighted number of expression in } idoc}$$

The weight is given by $sig_{word}$.

The factor norm (idoc) may be introduced, for example, in order to prevent very large documents from having a dominant effect on a specific data link. By way of example, the factor may be determined empirically.

The information-theory entropy of a synset isyn can thus be defined by:

$$Entropy_{isyn} = \log(freqsum_{isyn}) - \sum_{idoc} F_{isyn}() \cdot \log(F_{isyn}())/freqsum_{isyn}$$

$$\text{where}: freqsum_{isyn} = \sum_{idoc} F_{isyn}()$$

A synset which appears to be well scattered over all of the language and/or text data items 10 and/or over all of the documents has a high "entropy" and will contribute little to distinguishing between the documents. For example, if documents/articles in a databank from the Neuen Zürcher Zeitung [New Zurich Newspaper] are intended to be analyzed, it is obvious that "Neuen Zürcher Zeitung" will appear in all of or a large number of the articles without having any distinguishing power for the content of the documents. For example, the term "Relevance Index" $RI_{isyn}$ can be defined as a measure for a general relevance of a synset isyn by:

$$RI_{isyn} = freqsum_{isyn}/Entropy_{isyn}$$

In order to define the axes of the n-dimensional content space (in this exemplary embodiment, n was chosen to be equal to 100), the relevance of a hyperonym (taxon node in the taxonomy table 21) is determined by integrating all of the text and/or language data items 10 to be analyzed, over all of the relevance indices. This relevance is a measure of the total hit frequency of a taxon node by all of the text and/or language data 10. This measure indicates which subject region and/or subject regions is or are predominant in a document collection. Theoretically, each taxon node can be associated with one axis in the content space. For example, this would result in a content space with a dimension of more than 4000, which would correspond to an enormous overhead and, furthermore, far too many degrees of freedom for content determination.

Figure 4:
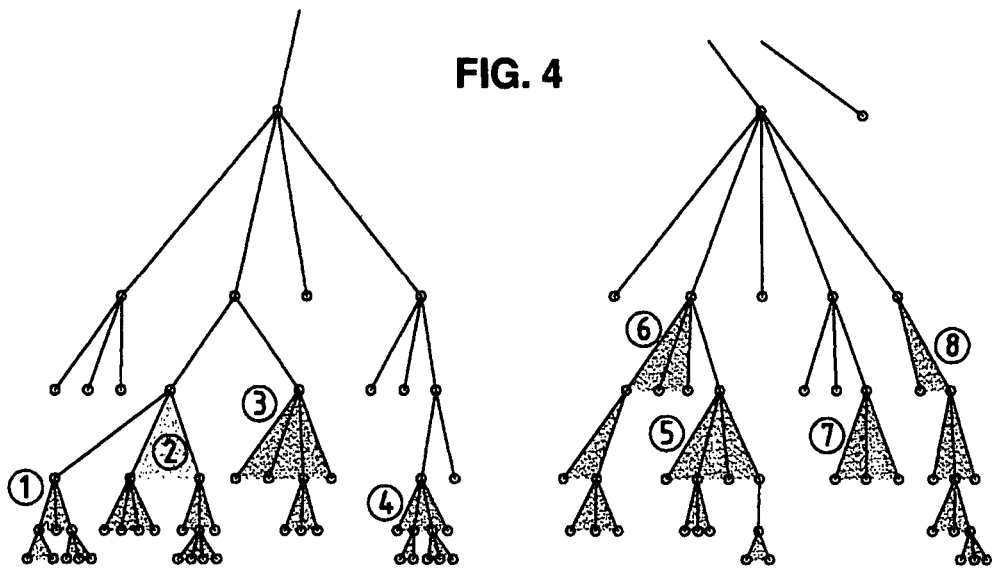
FIG. 4 shows a block diagram which schematically illustrates the formation of agglomeration clusters in the taxonomy table.

For this reason, the taxon nodes may, for example, be clustered, for example into n−2 (for example n−2=98) different clusters, for example by means of a condition that the accumulated relevance of the "mother node" of a cluster of taxon nodes and all its sub-nodes corresponds to at least one predefineable threshold value (for example 0.5%) of the total relevance. The cluster is formed at the lowest possible level of the taxonomy tree or taxonomy table. This method can be compared, for example, with the formation of agglomerates in demography. Each cluster (with all of the corresponding synsets which refer to it) is associated with one axis in the n-dimensional content space. Axis n−1 is used, for example, for synsets which do not refer to one of the agglomeration clusters, and the axes n are reserved for numbers. FIG. 4 shows, schematically, the formation of agglomeration clusters such as these in the taxonomy table.

Figure 5:
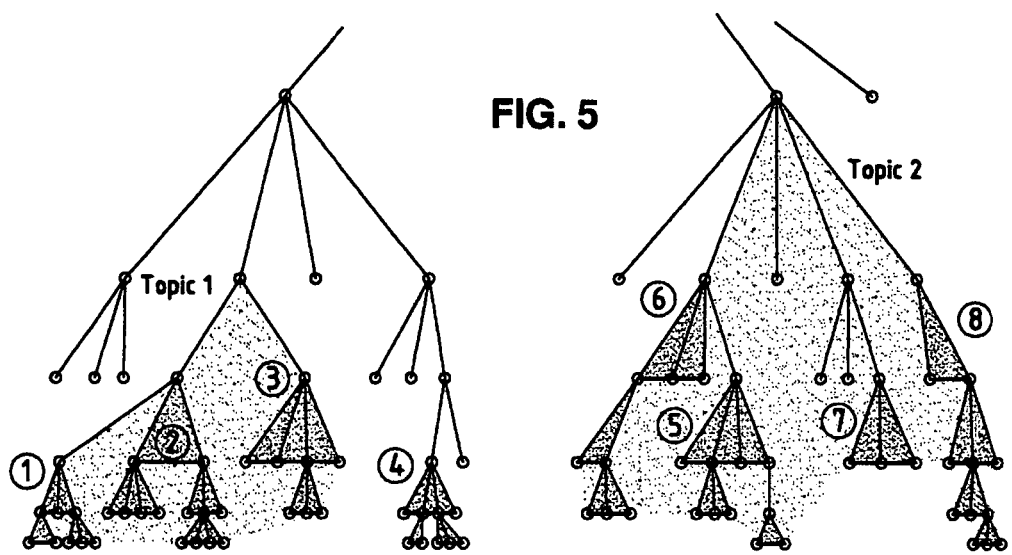
FIG. 5 shows a block diagram which schematically illustrates one example of the combination of an agglomeration cluster into subject regions.

Finally, for example, ntop subject regions are formed which are each composed of a specific sub-group of agglomeration clusters (ntop may, for example, be in the order of magnitude of 10 to 20). The agglomerates are formed in such a way that the taxon nodes of an agglomeration cluster which is associated with the same subject region (topics) has a common mother node in the hierarchy of the taxonomy table. The transformation rule which results from this may, for example, be as follows: each synset refers to one of the selected agglomeration clusters, corresponding to one axis in the content space or an axis n−1. A large number of synsets in turn refer to one of the ntop subject regions at a higher aggregation level. FIG. 5 shows one example of the combination of an agglomeration cluster into subject regions.

For projection of the documents to be analyzed, that is to say the language and/or text data 10, onto the n-dimensional content space, the vector component $c_i$ for the i-th axis of the content space can be defined for each document idoc by:

$$c_i = \log(1 + w_i)$$

where $$w_i = \sum_{\forall Synsets_{Axis_i}} F_{isyn}(idoc)$$

where $F_{isyn}$ (idoc) is given by the above formula:

The unit (metric) for the n-dimensional space is determined by means of the overall entropy of all of the synset which refer to one axis $I(\forall Synsets_{AxisI})$, in which case the overall entropy can be determined in an analogous way to that for the entropy of the synsets as defined above. The weights $g_i$ for the i-th component can then be determined, for example, by:

$g_i$=1/(overall entropy of the $i$-th component)

This definition results, for example, in components with a low entropy (that is to say with a low degree of distribution (high discrimination effect)) having a correspondingly high weight.

A synset relevance value $Relev_{isyn}$ is determined for the choice of the m most typical descriptors of a document, that is to say specific language and/or text data 10, for each synset isyn in the document idoc, for example by:

$Relev_{isyn}(idoc)=(ln(1+F_{isyn}(idoc))/ln(1+freqsum_{isyn}))/Entropy_{isyn}$

The m synsets with the highest relevance value $Relev_{isyn}$ may be selected, for example, as the m descriptors which are most typical for a document idoc. These descriptors which, for example, can be stored associated with their corresponding hyperonyms are used for cataloging and/or indexing. They include the most important characteristics of a document even in those situations in which the projection onto the content space is reproduced in a non-optimal manner by the content of a specific document.

For automated cataloging and/or indexing, the method mentioned above, which is based on the statistical and/or linguistic analysis method mentioned, is combined with one or more neural network modules 26. This statistical and/or linguistic analysis method is used, as described, to produce a comprehensive universal taxonomy table 21 for identification of the subject content. In order now to provide an overview of all of the text and/or language data 10, that is to say of all of documents idoc to be analyzed, and in order on the other hand to generate a function for the similarity comparison, the results of the linguistic analysis are combined with neural network technologies. It has been found that so-called self-organizing map (SOM) techniques, for example Kohonen, can be very highly suitable. In contrast, it is obvious to a person skilled in the art that other neural network techniques may also be worthwhile or more suitable for specific applications without restricting the scope of protection of the patent in any way.

The SOM technique can be applied to the described projection method for the text and/or language data 10 to be analyzed, that is to say the documents idoc to the n-dimensional content space (for example n=100). Before the neural network iterations are started by means of the neural network module 26 (unsupervised learning), it is possible, for example, to use a rough compensation method for the group, in order to obtain a reliable initial estimate for the SOM technique. This method can considerably speed up the iteration process and can minimize the risk of the SOM technique ending in a non-optimum configuration (for example a local minimum). The distance between two vectors (documents idoc) a and b can be determined for the SOM algorithm for example by:

$$Distance = \sqrt{\sum_i g_i \left(\frac{a_i}{\|a\|} - \frac{b_i}{\|b\|}\right)^2 + KL_{a,b}}$$

where $KL_{a,b}$ is the Kullback-Leibler distance between two documents in the following sense, that the assignment of a document idoc is measured by means of a content vector c to a subject region jtop using $$h_{jtop,c} = \sqrt{VectorPart + DescriptorPart + ErrMS}$$

where $$VectorPart = \sum_{\forall Components_{jtop}} g_i \left(\frac{c_i}{\|c\|}\right)^2$$

where $\forall Components_{jtop}$ corresponds to all of the components which refer to jtop.

$$DescriptorPart = \sum_{\forall Descriptors_{jtop}} (Relev_{isyn}(idoc))^2$$

Where, once again, $\forall Descriptors_{jtop}$ corresponds to all of the descriptors which refer to jtop. ErrMS is the estimate of the mean square error (discrepancy) where, for example, $ErrMS \geq 10^{-5}$. The normalized dimensions $$P_{jtop,c} = h_{jtop,c} / \sum_{itop} h_{itop}$$

may, for example, be interpreted as probabilities of the document idoc belonging to a specific subject region jtop. The Kullback-Leibler distance between two documents idoc and kdoc with the content vectors a and b is given, for example, by $$KL_{a,b} = \frac{1}{ntop} \sum_{jtop} (P_{jtop,a} - P_{jtop,b}) \ln(P_{jtop,a} / P_{jtop,b})$$

Figure 6:
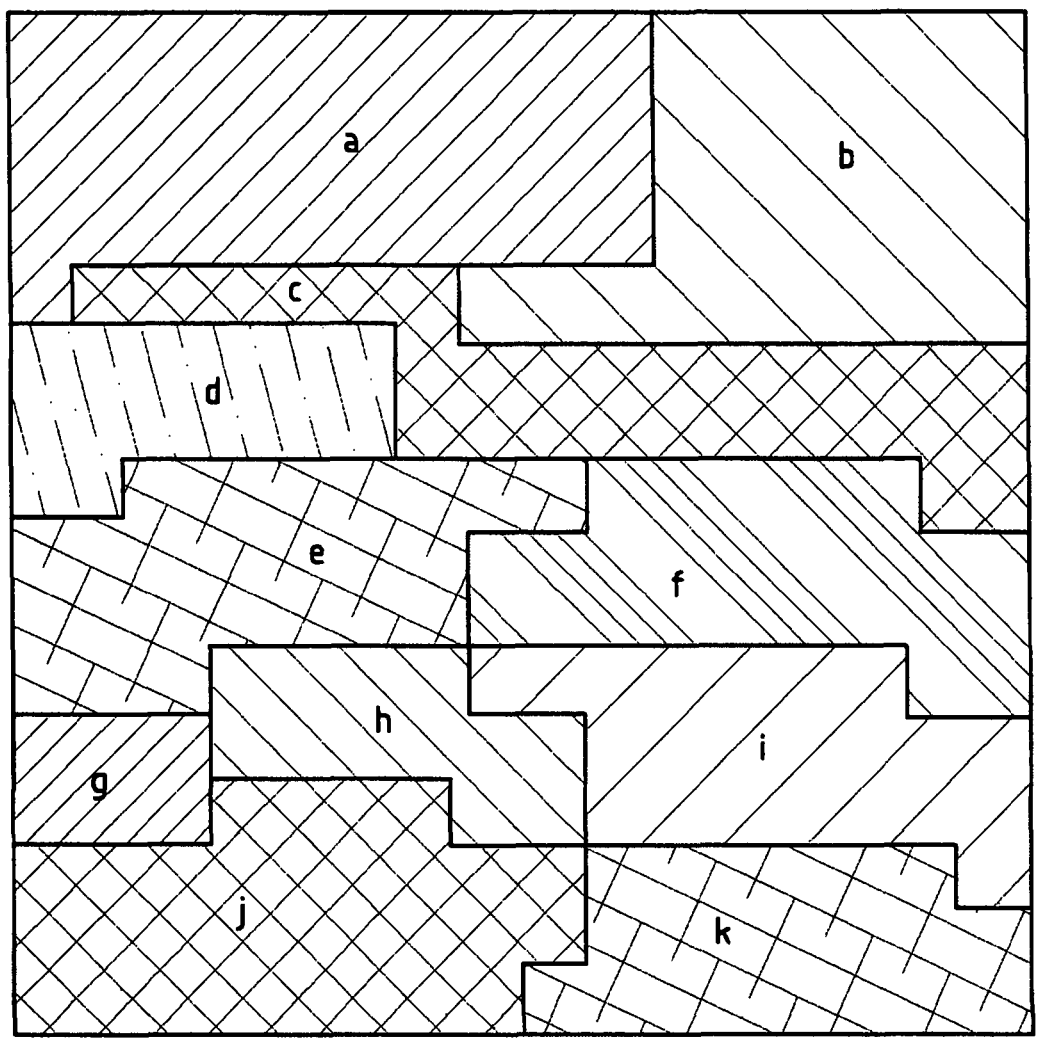
FIG. 6 shows a block diagram which schematically illustrates an information map or Kohonen map. The documents to be analyzed, that is to say all of the text and/or language data 10 are grouped by means of the SOM technique, with constraints, by the neural network module 26 into a two-dimensional array of neurons (=information map).
Figure 7:
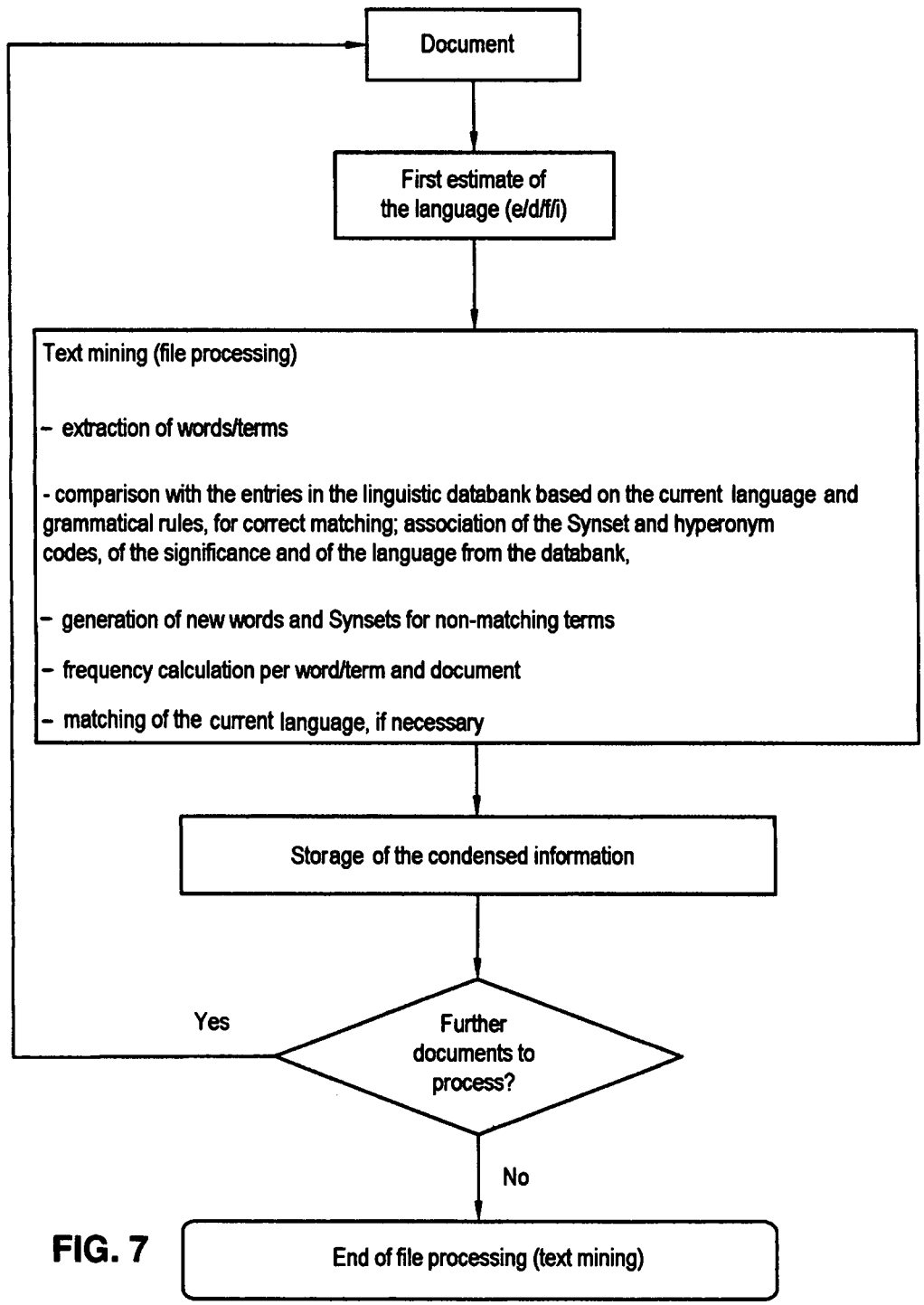
FIG. 7 shows a flowchart which illustrates method steps for the initial analysis of document collections, as a so-called text mining step.

The Kullback-Leibler part in the total distance includes the fact that the documents have been moved to the correct global region by the SOM technique. The Kullback-Leibler part thus acts as a constraint of the SOM technique. The metric part in the total distance, in contrast, is responsible for local placing in the individual neurons in a subject region. The SOM technique with constraints is used to group the documents to be analyzed, that is to say all of the text and/or language data 10 by means of the neural network module 26 in a two-dimensional array of neurons (=information map). FIG. 6 shows the result of an information map or Kohonen map such as this. The documents in a neuron are thus similar to one another, in terms of their subject content. The neurons are grouped in such a manner that they are located in the global subject region with which they are mainly associated, and neurons linked by subject are located close to one another (see FIG. 6 with the subject regions a, . . . , k).

In the comparison and assessment method, a search request may, for example, comprise a pair of search expressions or a text document in a natural language. The search text may, for example, include the entire content of a document, in order to search for similar documents in the indexed and/or catalogued document collection. The search text may, however, also for example include only a small portion of the relevant document. For this reason, in some circumstances, the metric distance between the search text and the documents may not be a reliable criterion for finding the documents which are closest to the search text. A more reliable measure for the comparison and the hierarchical assessment is produced by the scalar product of the content vectors. A measure such as this guarantees that the common parts between the search text and the documents are effectively taken into account. A similarity measure between the search text and a document may be defined, for example, by $$\text{Similarity} = \sum_i \frac{q_i \cdot c_i}{\|q\| \cdot \|c\|} + DescrSim$$

where q is the content vector of the search text, c is the content vector of the neuron in which the document is placed, and DescrSim is the measure of the similarity between the m descriptors of the search text and the document (for example m=20), as described further below. The term DescrSim comprises the weighted sum of different descriptor pairs, in which case pairs with identical descriptors in the search text and in the searched document can be weighted, for example, with 100 points. Pairs with descriptors which relate to a common hyperonym (taxon node in the taxonomy table) may, for example, be weighted with 30 points, if the common taxon node is the direct taxon node of the descriptors, with 10 points if the common taxon node is a hierarchy level above this, three points if the common taxon node is two hierarchy levels above this, and one point if the common taxon node is three hierarchy levels above this. With $Relev_{isyn}()$ as the relevance value of the descriptors in a document, it is possible, for example, to determine that:

$$DescrSim = \frac{0.01}{S_{norm}} \sum_{Pairs} (\text{Weighting for pairs } isyn_1/isyn_2) \cdot weight_{isyn_1, isyn_2}$$

where $$weight_{isyn_1, isyn_2} = Relev_{isyn_1}(\text{Search text}) \cdot Relev_{isyn_2}(\text{Document})$$

$$S_{norm} = (m/m1) \cdot \sum_{Pairs} weight_{isyn_1, isyn_2}$$

where m1=number of matching pairs (m1≦m). The scalar products in the similarity measure as defined above corresponds to the similarity between a neuron (partial collection of the documents) and the search text. The term DescrSim quantifies the details for the individual documents in a given neuron. The factor "0.01" in the definition of DescrSim may, for example, be determined on an empirical basis. For example, it can be determined in such a manner that the scalar product (cross positioning) and the individual extensions (DescrSim) are split into a balanced form.

The comparison method is clear for the comparison and the assessment with the similarity measure as defined above. For example, nDoc documents are found which are closest to a specific search text. First of all, the subarea with the neurons with the highest scalar products is looked for until the number of selected documents exceeds, for example, the limit value of 3·nDoc. The selected documents are then sorted on the basis of their similarity values (including the extension DescrSim) in decreasing order. The first nDoc documents form the desired documents in the assessment order. In the situation in which the subject search does not result in any sense, that is to say for example if the search request is composed of only a few words, which do not contribute to any distinguishing content, the selection can be made by, for example, using the search index for the individual synsets within a document. The similarity measure defined further above may, for example, extend from 0 to 2. The transformation to a weighting percentage can be achieved, for example, using:

$$\text{Weighting percentage} = \left(\frac{\text{Similarity}}{2}\right)^{1/3} \cdot 100\%$$

The identification of document derivatives means the identification of clusters of documents whose content is virtually identical. By way of example, these may be different copies of the same document with minor changes, such as those which may apply to patent texts in a patent family, whose text and/or scope of protection may vary slightly from one country to another. The apparatus according to the invention and/or the method allow/allows the automated identification of document clusters with virtually identical documents. Furthermore, this makes it possible to suppress older document versions, and may be a tool in order to manage document collections such as these and to keep them up to date (for example by means of a regular clean-up).

In the case of cluster identification, the similarity measure which is used for comparison and/or weighting of the documents for a search text, may in certain circumstances not produce satisfactory results to discover document clusters such as these. For document clustering, the distance between two documents $idoc_1$ and $idoc_2$ with their content vectors a and b is measured by $$DocDist = \sqrt{\sum_i g_i \left(\frac{a_i}{\|a\|} - \frac{b_i}{\|b\|}\right)^2} + DescrDist$$

where DescrDist is the weighted sum of the derivative of the descriptors. In this case, for example, it is possible to determine that matching descriptor pairs from two sets of m descriptors (for example m=20) contribute nothing, while non-matching descriptor pairs are weighted with one point if they have one direct common taxon node, with two points if they have one common taxon node in a hierarchy level above this, and five points for the other cases. Using $Relev_{isyn}()$ as the relevance value of the descriptor within a document, it is possible, for example, to determine that:

$$DescrDist = \frac{0.1}{D_{norm}} \sum_{Pairs} (\text{Result for pairs } isyn_1/isyn_2) \cdot Relev_{isyn_1}(idoc_1) \cdot Relev_{isyn_2}(idoc_2)$$

where $$D_{norm} = \sum_{Pairs} Relev_{isyn_1}(idoc_1) Relev_{isyn_2}(idoc_2)$$

The factor "0.1" in the definition of DescDist may, for example, be determined empirically, for example by weighting the metric distance and the derivatives of the descriptors in a balanced manner with respect to one another.

Figure 8:
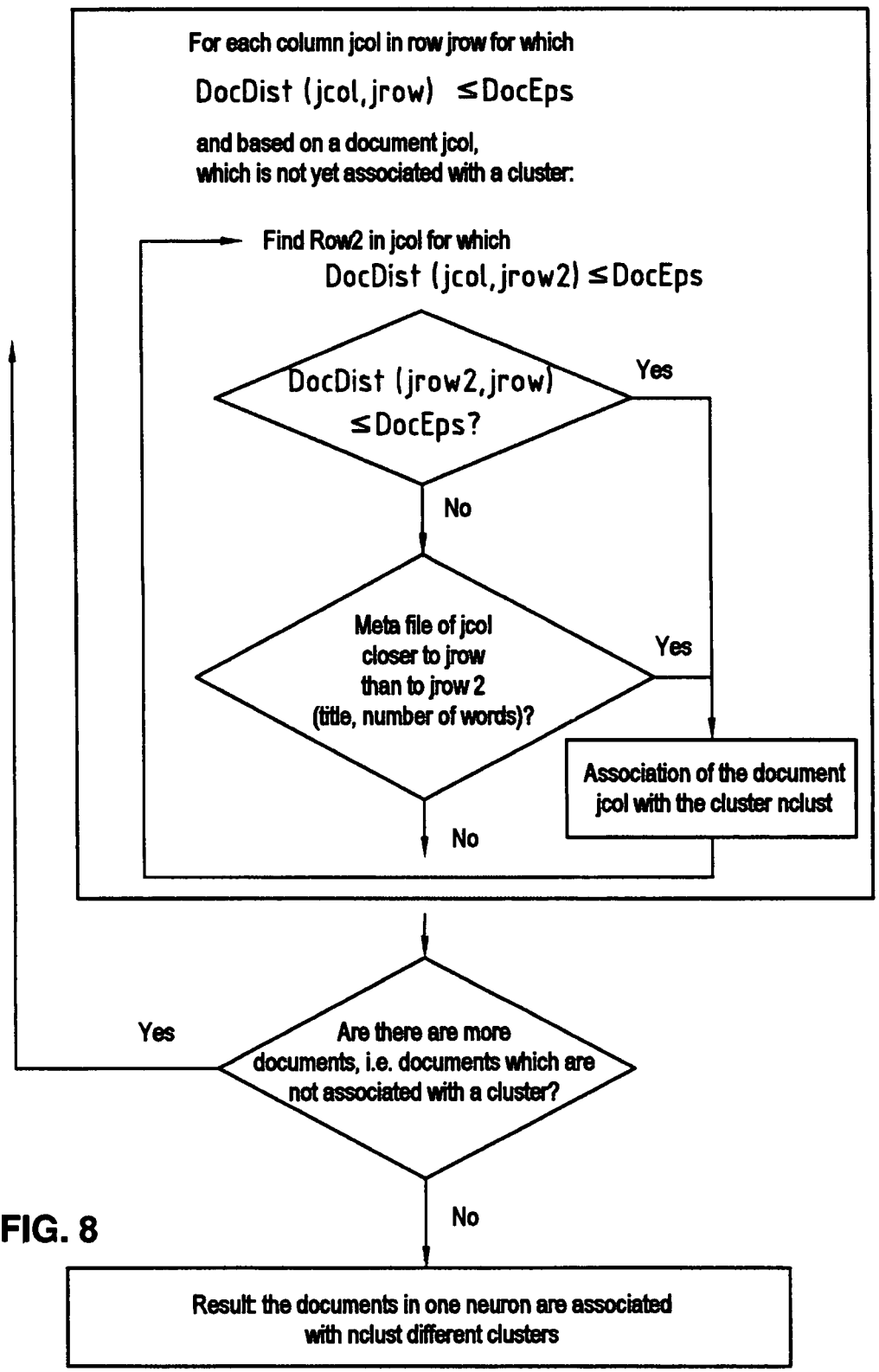
FIG. 8 shows a scheme for the generation of clusters in a neuron. DocEps corresponds to a tolerance which can be defined for the maximum distance between the members of a cluster.

The SOM algorithm with constraints guarantees that the candidates for a specific document cluster are placed in the same neuron. This makes it possible to achieve the clustering for each neuron individually. For example, as described above, the distance matrix can be determined (symmetrical matrix with all zero elements on the diagonal) with DocDist for the documents within one neuron. FIG. 8 shows a scheme for the generation of clusters in one neuron. DocEps corresponds to a tolerance which can be defined for the maximum distance between the members of a cluster.

It should be noted that the present invention can be used not only as a language and text analysis apparatus 20 for the formation of a search and/or classification catalog. The applications are wide, for any point of view. For example, it is thus possible to automatically identify data within one or more networks 40, 41, 42, such as the Internet, and to associate them with one region. Until now, this has not been possible in the prior art since the use of a universal taxonomy table was not possible in conjunction with automated cataloging and/or indexing. The communication networks 40, 41, 42 are in the form, for example, of a GSM network or a UMTS network, or a satellite-based mobile radio network, and/or one or more landline networks, for example the public switching telephone network, the worldwide Internet or a suitable LAN (Local Area Network) or WAN (Wide Area Network). In particular, this also includes ISDN and XDSL links. Users may, for example, access the one or more networks 40, 41, 42 by means of any network-compatible terminals 30, 31, 32, 33, such as any CPE (Customer Premise Equipments), Personal Computers 30, laptops 31, PDAs 32, mobile radio devices 33, etc. Nowadays, the apparatus can in fact be used, for example, not only to find specific data, but also for automated monitoring and/or control of data flows in networks. For example, the invention can thus also be used for antiterrorism purposes (for example early identification of an act of terror) or for combating other criminality over the Internet (for example racism, pedophilia, etc.).

It is important to note that the cluster formation/agglomerate formation according to the invention does not relate to the individual documents, as is the case in the prior art in some cases (see for example WO 03/052627, U.S. Pat. No. 6,711,585). According to the invention, the totality of all the expressions that occur is subdivided into clusters in order to form from them a content space which can optimally characterize the subjects dealt with in the document collection. However, according to the invention, this is just one intermediate step for the projection of the documents onto the vectors, which in the end is used for the classification of the documents in the Kohonen map. In the present invention, the linguistic databank that has been mentioned forms the basis for the text analysis. The linguistic databank may be very large, as in the present case, for example in this case with more than 2.2 million entries in different languages (in this case for example English, German, French and Italian). The system links words and linked expressions of similar meaning to form synonym groups in more than one language and to link them to the "universal" taxonomy tree (for the purpose of classification of the content of the synonym groups). As mentioned, during the analysis of a specific document collection, a 100-dimensional content space is first of all constructed from the effective content of the available documents together with the links and relationships which are stored in the linguistic databank, and the axes of this content space can optimally characterize the available document contents. After projection of the documents onto the constructed content space, the documents are logically subdivided by means of the self-organizing neural networks (in this case, Kohonen map), and are provided, completely automatically, with descriptors. The particular feature of the present invention and of the new technology is the fact that there is no longer any need for human preparatory work for the classification of any given document collection: no preparatory work for a specific vocabulary, no specific taxonomy, no specific thesauruses and, in particular, no complex training for the document classification. In addition, the multiple language program is solved consistently (an English translation of a German document) is given the same classification as the German original). These are direct consequences of the reference to the linguistic databank with the universal taxonomy and the situationally constructed projection onto an optimum content space. Until now, it has also been possible to achieve this only approximately by means of any known prior art.

The invention claimed is:

1. A language and text analysis apparatus for forming a search and classification catalog, the apparatus having at least one linguistic databank for accessing linguistic terms with data records so as to perform at least one of classifying and sorting at least one of language and text data corresponding to the data records, the linguistic terms having at least one of keywords and search terms, and the linguistic databank further having links between words and linked terms of similar meaning so that the links are associated with synonym groups in a taxonomy table, the apparatus comprising:
   a weighting module for weighting of table elements in the taxonomy table on a basis of frequency of occurrence of individual links in the linguistic databank,
   an integration module configured to generate a multidimensional, weighted n-dimensional content matrix in an n-dimensional content space on a basis of agglomerates of elements in the taxonomy table, and configured to choose and project axes of the n-dimensional content matrix based on a relevancy of a total hit frequency of words and linked terms of all the data records for the at least one of the language and text data so as to optimally characterize the data records with the axes, and
   a neural network module for at least one of classification and sorting of at least one of the language and text data on a basis of the content matrix, by using definable descriptors for the language and text analysis apparatus to determine appropriate constraints for one or more subject groups.

2. The language and text analysis apparatus as claimed in claim 1, wherein the links in the linguistic databank are defined over more than one language.

3. A language and text analysis apparatus for formation of a search and classification catalog, the apparatus having at least one linguistic databank for association of linguistic terms with data records, so that the language and text analysis apparatus is configured to perform at least one of classifying and sorting at least one of language and text data corresponding to the data records, the linguistic terms including at least one of keywords and search terms, the apparatus comprising:

a taxonomy table with variable taxon nodes on a basis of the linguistic databank, so that one or more data records can be associated with one taxon node in the taxonomy table, and each data record includes a variable significance factor for weighting of terms on a basis of at least one of filling words, linking words, and keywords, a weighting module, in which a weighting parameter for recording of frequencies of occurrence of terms within the at least one of language and text data to be at least one of sorted and classified is additionally stored associated with each taxon node, an integration module for determination of agglomerates on a basis of the weighting parameters of the taxon nodes in the taxonomy table, with one agglomerate including at least one taxon node, the agglomerates associated with an n-dimensional content matrix in an n-dimensional content space, and for choosing and projecting axes of the n-dimensional content matrix based on a relevancy of a total hit frequency of words and linked terms of all the data records for the at least one of the language and text data so as to optimally characterize the data records with the axes, and a neural network module configured to perform at least one of classification and sorting of at least one of the language and the text data on a basis of the agglomerates in the taxonomy table.

4. The language and text analysis apparatus as claimed in claim 3, wherein the neural network module includes a self-organizing Kohonen map.

5. The language and text analysis apparatus as claimed in claim 3, further comprising:

an entropy module for determining an entropy parameter, stored in a memory module, on a basis of distribution of a data record in the at least one of the language or the text data.

6. The language and text analysis apparatus as claimed in claim 3, wherein the linguistic databank includes multilingual data records.

7. The language and text analysis apparatus as claimed in claim 3, further comprising:

a hash table that is associated with the linguistic databank so that a hash value is used to identify linguistically linked data records in the hash table.

8. The language and text analysis apparatus as claimed in claim 3, wherein a language parameter is used to associate the data records with a language and is identified as a synonym in the taxonomy table.

9. The language and text analysis apparatus as claimed in claim 3, further comprising:

descriptors by which constraints that correspond to definable descriptors are determined for a subject group.

10. The language and text analysis apparatus as claimed in claim 3, wherein the databank includes a universal, subject-independent, linguistic databank, and the taxonomy table is produced universally and independently of subject.

11. An automated language and text analysis method for forming a search and classification catalog, with a linguistic databank being used to record data records and to perform at least one of classifying and sorting at least one of language and text data on a basis of the data records, the method comprising the steps of:

associating the data records that are stored in the linguistic databank with a taxon node in a taxonomy table, with each data record including a variable significance factor for weighting of terms based one at least one of filling words, linking words, and keywords, recording at least one of the language and text data on a basis of the taxonomy table, with frequency of individual data records in the at least one of the language and text data being determined by a weighting module and being associated with a weighting parameter for the taxon node, determining a determinable number of agglomerates by an integration module in the taxonomy table on a basis of the weighting parameters of one or more taxon nodes, the agglomerates associated with an n-dimensional content matrix in an n-dimensional content space, choosing and projecting axes of the n-dimensional content matrix based on a relevancy of a total hit frequency of words and linked terms of all the data records for the at least one of the language and text data so as to optimally characterize the data records with the axes, and using a neural network module to perform at least one of classifying and sorting at least one of the language and text data on a basis of the agglomerates in the taxonomy table.

12. The automated language and text analysis method as claimed in claim 11, wherein the neural network module includes a self-organizing Kohonen map.

13. The automated language and text analysis method as claimed in claim 11, further comprising a step of:

using an entropy module to determine an entropy factor on a basis of distribution of a data record in the at least one of language and text data.

14. The automated language and text analysis method as claimed in claim 11, wherein the linguistic databank includes multilingual data records.

15. The automated language and text analysis method as claimed in claim 11, wherein a hash table is stored associated with the linguistic databank, with the hash table including an identification of linked data records by a hash value.

16. The automated language and text analysis method as claimed in claim 11, further comprising a step of:

associating the data records with a language and that is weighted synonymously in the taxonomy table by a language parameter.

17. The automated language and text analysis method as claimed in claim 11, further comprising a step of:

using definable descriptors to determine corresponding constraints for a subject group.

18. The language and text analysis method as claimed in claim 11, further comprising a step of:

producing the taxon nodes in the taxonomy table on a basis of a universal, subject-independent, linguistic databank, with the databank including at least the universal, subject-independent, linguistic databank.

19. A non-transitory computer-readable medium with computer program code recorded thereon, the computer program code configured to control one or more processors in a computer-based system to perform a method for automated language and text analysis by formation of a search and/or classification catalog, with data records being recorded on the basis of a linguistic databank, and with language and/or text data being classified and/or sorted on the basis of the data records, the method comprising the steps of:

storing the data records in the linguistic databank associated with a taxon node in a taxonomy table, with each data record including a variable significance factor for weighting of terms on the basis of at least one of filling words, linking words, and keywords, recording at least one of the language and text data on the basis of the taxonomy table, with frequency of individual data records in the at least one of language and text data determining a weighting parameter for the taxon node, determining a determinable number of agglomerates in the taxonomy table on the basis of the weighting parameter of one or more taxon nodes, the agglomerates associated with an n-dimensional content matrix in an n-dimensional content space, choosing and projecting axes of the n-dimensional content matrix based on a relevancy of a total hit frequency of words and linked terms of all the data records for the at least one of the language and text data so as to optimally characterize the data records with the axes, and generating a neural network, which performs at least one of classifying and sorting the at least one of language and text data on the basis of the agglomerates in the at least one of the taxonomy table, the language, and text data.

* * * * *